(12) United States Patent
Shinoda et al.

(10) Patent No.: US 12,366,556 B2
(45) Date of Patent: Jul. 22, 2025

(54) ULTRASONIC TESTING METHOD AND ULTRASONIC TESTING DEVICE

(71) Applicant: KANADEVIA CORPORATION, Osaka (JP)

(72) Inventors: Kaoru Shinoda, Osaka (JP); Masamitsu Abe, Osaka (JP); Joichi Murakami, Osaka (JP); Hiroshi Hattori, Osaka (JP)

(73) Assignee: KANADEVIA CORPORATION, Osaka (JP)

( * ) Notice: Subject to any disclaimer, the term of this patent is extended or adjusted under 35 U.S.C. 154(b) by 241 days.

(21) Appl. No.: 17/761,889

(22) PCT Filed: Jul. 9, 2020

(86) PCT No.: PCT/JP2020/026797
§ 371 (c)(1),
(2) Date: Mar. 18, 2022

(87) PCT Pub. No.: WO2021/053939
PCT Pub. Date: Mar. 25, 2021

(65) Prior Publication Data
US 2022/0334088 A1 Oct. 20, 2022

(30) Foreign Application Priority Data

Sep. 19, 2019 (JP) ................................. 2019-169928

(51) Int. Cl.
*G01N 29/265* (2006.01)
*G01N 29/04* (2006.01)
(Continued)

(52) U.S. Cl.
CPC ......... *G01N 29/265* (2013.01); *G01N 29/043* (2013.01); *G01N 29/069* (2013.01);
(Continued)

(58) Field of Classification Search
CPC ................................................ G01N 29/00–52
See application file for complete search history.

(56) References Cited

U.S. PATENT DOCUMENTS 2,949,028 A * 8/1960 Joy ...................... G01N 29/348
367/901
6,330,831 B1 12/2001 Lynnworth et al.
(Continued)

FOREIGN PATENT DOCUMENTS

JP 62-207957 A 9/1987
JP 63-070079 U 5/1988
(Continued)

OTHER PUBLICATIONS

Notice of Reasons for Refusal dated Jan. 24, 2023 issued in corresponding Japanese Patent Application No. 2019-169928 with English translation (6 pgs.).
(Continued)

*Primary Examiner* — Judy Nguyen
*Assistant Examiner* — James Split
(74) *Attorney, Agent, or Firm* — Pillsbury Winthrop Shaw Pittman, LLP

(57) ABSTRACT

In an ultrasonic testing method and an ultrasonic testing device that ultrasonically examine a flaw of a subject, a scanning range specified for the subject is scanned while flaw testing is performed by an array probe, and it is determined that a flaw is present at a point where a groove signal DG is present and a bottom echo signal BE is not obtained.

4 Claims, 7 Drawing Sheets

(51) Int. Cl.
    *G01N 29/06* (2006.01)
    *G01N 29/24* (2006.01)
    *G01N 29/26* (2006.01)
(52) U.S. Cl.
    CPC ....... *G01N 29/2437* (2013.01); *G01N 29/262* (2013.01); *G01N 2291/0234* (2013.01); *G01N 2291/0289* (2013.01); *G01N 2291/044* (2013.01); *G01N 2291/106* (2013.01); *G01N 2291/267* (2013.01)

(56) References Cited

U.S. PATENT DOCUMENTS

| | | | |
|---|---|---|---|
| 9,341,599 B2 * | 5/2016 | Iizuka | G01N 29/4427 |
| 2021/0003532 A1 | 1/2021 | Bain et al. | |

FOREIGN PATENT DOCUMENTS

| | | |
|---|---|---|
| JP | 03-056852 A | 3/1991 |
| JP | 09-171005 A | 6/1997 |
| JP | 2001-324484 A | 11/2001 |
| JP | 2002-350407 A | 12/2002 |
| JP | 2004-317475 A | 11/2004 |
| JP | 2005-181170 A | 7/2005 |
| JP | 2008-197003 A | 8/2008 |
| JP | 2012-177685 A | 9/2012 |
| JP | 2016-191572 A | 11/2016 |
| JP | 2017-078662 A | 4/2017 |

OTHER PUBLICATIONS

Decision to Grant a Patent dated Feb. 6, 2024, issued in corresponding Japanese Patent Application No. 2023-112722 with English translation (5 pgs.).

International Search Report dated Oct. 6, 2020, issued in corresponding International Application No. PCT/JP2020/026797, with English translation (6 pgs.).

Office Action dated Sep. 2, 2024, issued in corresponding India Patent Application No. 202247013897 (10 pgs.).

* cited by examiner

F I G. 1
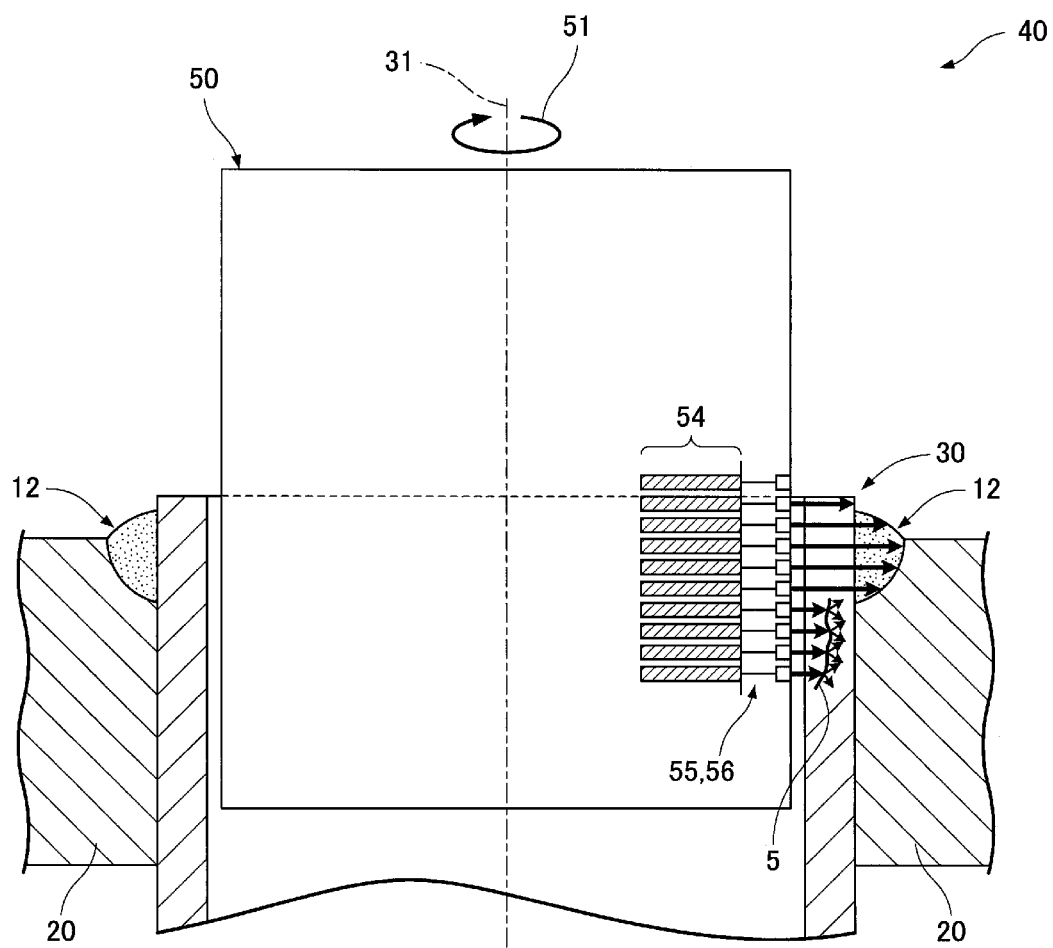

ULTRASONIC TESTING METHOD AND ULTRASONIC TESTING DEVICE

CROSS-REFERENCE TO RELATED APPLICATIONS

This application is the U.S. National Stage of PCT/JP2020/026797, filed Jul. 9, 2020, which claims priority to Japanese Patent Application No. 2019-169928, filed Sep. 19, 2019, the entire contents of both of which are herein incorporated by reference in their entireties.

TECHNICAL FIELD

The present invention relates to an ultrasonic testing method and an ultrasonic testing device that ultrasonically examine a flaw of a subject, and particularly relates to an ultrasonic testing method and an ultrasonic testing device that conduct an examination by using an array probe including a plurality of array elements for emitting ultrasonic waves.

BACKGROUND ART

Various facilities such as plants, waste treatment facilities, and power generators are provided with equipments such as a multi-tubular heat exchanger including tube materials welded perpendicularly through a tubesheet material. In order to examine a state of a welded part between the tube material and the tubesheet material, conventionally, an ultrasonic testing method is conducted using an ultrasonic testing device as described in Japanese Patent Laid-Open No. 2016-191572.

In the ultrasonic testing device described in Japanese Patent Laid-Open No. 2016-191572, when a welded part around a tube is examined by ultrasonic testing, ultrasonic waves are emitted from an array probe including a plurality of array elements placed in the axial direction of the tube.

Thereafter, the ultrasonic testing device receives the reflection of the ultrasonic waves (reflection echo) and determines the presence or absence of a flaw from the received reflection echo. According to the ultrasonic testing method using the ultrasonic testing device, a flaw occurring in the welded part is securely and quickly detected.

SUMMARY OF INVENTION

Technical Problem

In the conventional ultrasonic testing method, however, an examination is conducted based on the signal of a reflection echo obtained by the reflection of ultrasonic waves, so that an examination cannot be correctly conducted in the absence of a reflection echo.

In the conventional ultrasonic testing method, if a reflection echo is sent back from a point of a sound subject where the reflection echo is not supposed to be reflected, the reflection echo is assumed to be the reflection of ultrasonic waves from a flaw. Thus, it is determined that a flaw is present at the point where the reflection echo is obtained.

As illustrated in FIG. 1, for example, an anisotropic flaw 5 (crack) may occur in a tube material 30 instead of a welded part 12 due to stress-corrosion cracking (SCC) or the like. Ultrasonic waves emitted from an array probe 55 to the flaw 5 are scattered at the flaw 5 and thus cannot reach the welded part 12 or return to an ultrasonic testing device 40. Thus, if the tube 30 has the flaw 5, e.g., a crack that scatters ultrasonic waves, a reflection echo is not obtained. Likewise, if a flaw that scatters ultrasonic waves is present on the welded part 12 instead of the tube material 30, a sound reflection echo is not obtained. If a reflection echo is not obtained, a flaw that reflects ultrasonic waves is assumed to be absent, that is, the subject is normal even if a flaw is actually present. This may cause a wrong examination result. Hence, in the presence of a flaw, e.g., a crack that scatters ultrasonic waves, a conventional examination is not correctly conducted based on a reflection echo.

The ultrasonic testing device described in Patent Literature 1 provides multiple scanning directions in order to increase the probability of flaw detection in various methods. However, a flaw occurring as a crack due to, for example, stress corrosion cracking (SCC) does not extend in a fixed direction and may have a complicated shape even in a small range. Since a flaw in such a complicated shape scatters ultrasonic waves entering from all directions, a correct examination cannot be correctly conducted only by providing multiple scanning directions.

Thus, an object of the present invention is to quickly find a flaw irregularly extending in various directions, for example, a crack caused by stress corrosion cracking (SCC). Another object of the present invention is to provide an ultrasonic testing method and an ultrasonic testing device that can obtain a correct examination result even if a subject is flawed to scatter ultrasonic waves.

Solution to Problem

In order to solve the problem, an ultrasonic testing method as an example of an embodiment of the present invention is an ultrasonic testing method for detecting a flaw of a subject by using ultrasonic waves, the method including: scanning in a scanning range specified for the subject by moving an array probe including a plurality of array elements for emitting ultrasonic waves, the array probe being moved in a direction different from the array placement direction of the array elements while performing flaw testing with ultrasonic waves emitted from the array elements into the scanning range; and determining that a flaw is present at a point where a bottom echo is not obtained by scanning and a point having a weaker bottom echo than other points in the scanning range.

It is preferable that the subject is a tube material, and in the scanning, the array probe is rotated about the center axis of the tube along the inner surface of the tube, the array probe being inserted in the tube such that the array elements placement direction is parallel to the lengthwise direction of the tube.

It is preferable that the method further includes creating flaw detection images at the rotation angles of the array probe rotated about the center axis of the tube, the flaw detection image being created as a result of flaw testing in the scanning based on an echo of ultrasonic waves emitted by the array probe, wherein in the determining, the flaw detection images are compared between the rotation angles.

It is preferable that in the scanning, a scanning direction of the array probe is set so as to be turned to multiple directions, and in the creating of the flaw detection image, the flaw detection image as the result of flaw testing in the scanning is created in each of the scanning directions based on the echo of ultrasonic waves emitted by the array probe, and the flaw detection images in each of the scanning directions are combined into an integrated image.

It is preferable that in the scanning, the scanning directions are three directions: a direction tilted to one side from a direction perpendicular to the center axis of the tube material, the direction perpendicular to the center axis of the tube material, and a direction tilted to the other side from the direction perpendicular to the center axis of the tube material.

It is preferable that in the creation of the flaw detection image, a bottom echo region is extracted as a part expected to have a bottom echo in the flaw detection image, and a whole-angle image is created such that the images of the bottom echo region at the rotation angles are arranged in the order of the rotation angles.

It is preferable that in the scanning, flaw testing is performed with the array probe pressed to the inner surface of the tube material.

An ultrasonic testing device as an example of the embodiment of the present invention is an ultrasonic testing device for detecting a flaw of a subject by using ultrasonic waves, the device including: an array probe including a plurality of array elements for emitted ultrasonic waves, the array elements being arranged in an array elements placement direction; a drive unit for moving the array probe in a direction different from the array elements placement direction; and an instruction unit for providing an instruction to perform flaw testing with ultrasonic waves emitted from the array elements into a scanning range specified for the subject, the flaw testing being performed while moving the array probe by means of the drive unit, wherein the ultrasonic testing device determines that a flaw is present at a point where a bottom echo is not obtained by scanning and a point having a weaker bottom echo than other points in the scanning range.

Advantageous Effects of Invention

According to the ultrasonic testing method and the ultrasonic testing device as an example of the embodiment of the present invention, even if a subject has a flaw that scatters ultrasonic waves, the point of the flaw can be detected.

In a scan with the array probe rotated about the center axis of the tube material, an angle where a flaw is present can be examined around the tube material at once.

Moreover, a created whole-angle image can clearly indicate a rotation angle where a flaw is present.

BRIEF DESCRIPTION OF DRAWINGS

FIG. 1 illustrates a longitudinal section of an ultrasonic testing device used in an ultrasonic testing method that is an example of an embodiment according to the present invention.

DESCRIPTION OF EMBODIMENT

Figure 2:
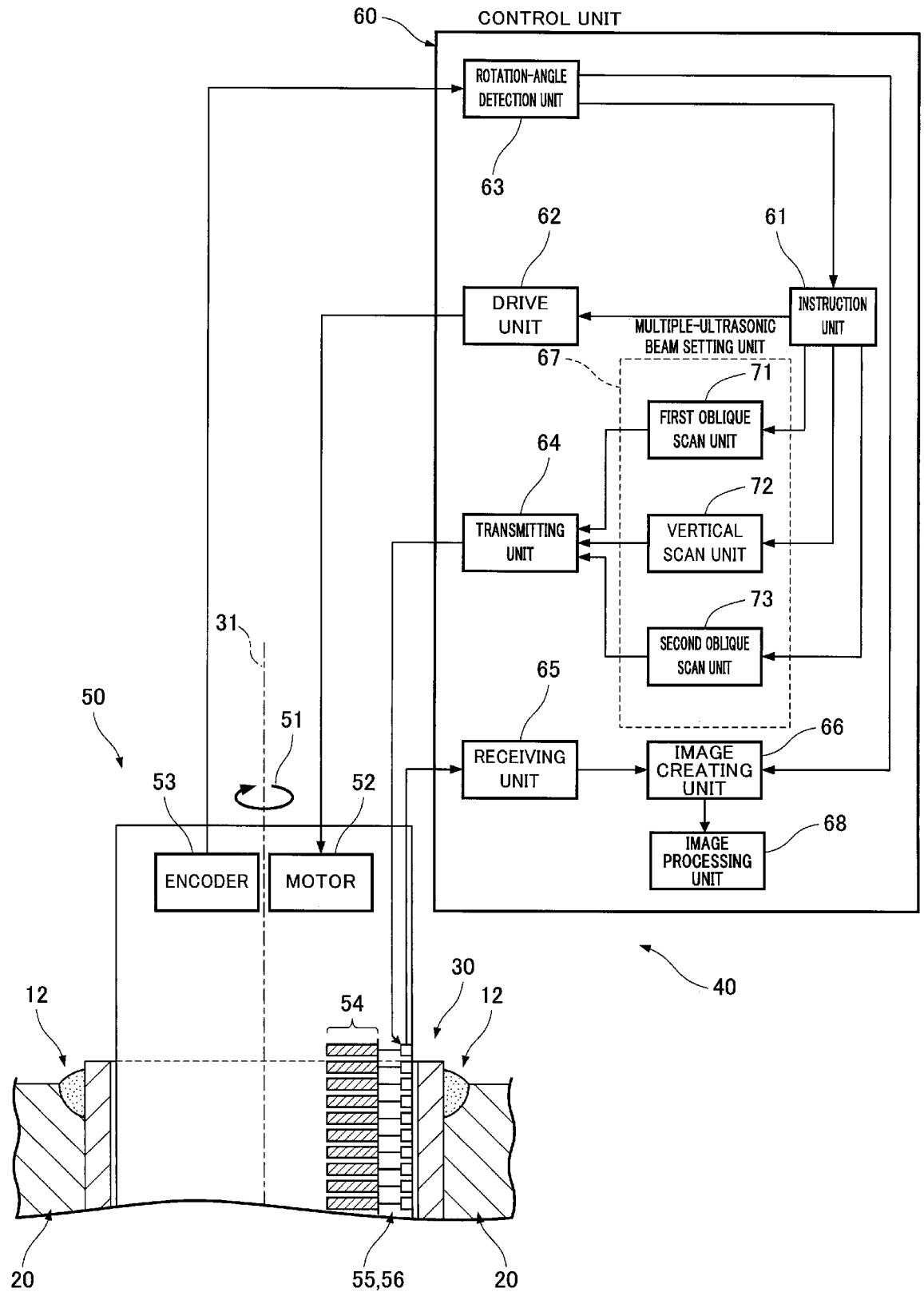
FIG. 2 illustrates the schematic configuration of the ultrasonic testing device in FIG. 1.

FIG. 1 illustrates a longitudinal section of an ultrasonic testing device 40 used in an ultrasonic testing method that is an example of an embodiment according to the present invention. The ultrasonic testing device 40 is supposed to examine a tube material extending in the lengthwise direction that is the vertical direction (longitudinal direction) of FIG. 1, and a tubesheet material 20 welded perpendicularly to the tube material 30. A subject is, in particular, a range including a welded part 12 that is formed around the tube material 30 between the tube material 30 and the tubesheet material 20. As illustrated in the plan view of FIG. 3, the multiple tube materials 30 are welded to the tubesheet material 20 extending like a flat surface. The tube materials 30 are disposed in parallel with one another.

[Schematic Configuration of the Ultrasonic Testing Device 40]

FIG. 2 illustrates a schematic configuration of the ultrasonic testing device 40. The ultrasonic testing device 40 includes a rotating flaw-detection unit 50 that is inserted into the tube material 30. The rotating flaw-detection unit 50 performs flaw testing from the inner surface of the tube material 30 while rotating about a center axis 31 of the tube material 30 in a predetermined rotation direction 51 (clockwise when viewed from above in FIG. 3). The ultrasonic testing device 40 includes a control unit 60 that controls the rotation of the rotating flaw-detection unit 50 and the flaw testing. Hereinafter, with call to the lengthwise direction (the vertical direction in FIG. 2) of the tube material 30, an inlet side from which the rotating flaw-detection unit 50 is inserted into the tube material 30 (the upper side in FIG. 2) will be referred to as a tube end side, whereas the opposite side (the lower side in FIG. 2) will be referred to as a tube center side.

The rotating flaw-detection unit 50 includes an array probe 55 having a plurality of array elements 56 placed along the lengthwise direction of the tube material 30, a motor 52 for rotating the rotating flaw-detection unit 50 about the center axis 31 of the tube material 30, and an encoder 53 for emitting a signal indicating the rotation angle of the rotating flaw-detection unit 50. The array probe 55 adjusts an oscillation time 54 of each of the array elements 56, thereby changing the scanning direction and the flaw detection range of ultrasonic waves.

The control unit 60 includes an instruction unit 61, a drive unit 62, and a rotation-angle detection unit 63. These units are relevant to the rotation of the rotating flaw-detection unit 50. The instruction unit 61 has the function of starting the rotating flaw-detection unit 50. The drive unit 62 drives the motor 52 in response to an instruction from the instruction unit 61. The rotation-angle detection unit 63 detects the rotation angle of the rotating flaw-detection unit 50 based on a signal from the encoder 53. The control unit 60 further includes a multiple-ultrasonic beam setting unit 67, a transmitting unit 64, a receiving unit 65, an image creating unit 66, and an image processing unit 68. These units are relevant to ultrasonic flaw testing. The multiple-ultrasonic beam setting unit 67 sets the scanning direction of the array probe 55 as multiple directions in response to an instruction from the instruction unit 61. The transmitting unit 64 causes the array probe 55 to emit ultrasonic waves based on the setting of the multiple-ultrasonic beam setting unit 67. The receiving unit 65 receives the reflection echo of ultrasonic waves emitted from the array probe 55 by the transmitting unit 64. The image creating unit 66 creates, based on the signal of the reflection echo received by the receiving unit 65, an image used for determining the presence or absence of a flaw in a subject. The image processing unit 68 performs image processing on the image created by the image creating unit 66.

The instruction unit 61 provides instructions for the drive unit 62 and the multiple-ultrasonic beam setting unit 67 based on a command issued by an external signal provided for the ultrasonic testing device 40 by an operator, or an angle detected by the rotation-angle detection unit 63. The drive unit 62 controls the drive and stop of the motor 52 by switching a connection between a battery, which is not illustrated, and the motor 52 based on the instruction from the instruction unit 61, so that the rotation angle of the rotating flaw-detection unit 50 is switched. Moreover, the rotation-angle detection unit 63 transmits the detected rotation angle of the rotating flaw-detection unit 50 to the instruction unit 61 and the image creating unit 66. In this way, the ultrasonic testing device 40 switches and detects the rotation angle; meanwhile, the ultrasonic testing device 40 emits ultrasonic waves from the array probe 55 at each rotation angle to perform flaw testing. Thus, a scan is performed in the scanning range (360° around the tube material 30).

The multiple-ultrasonic beam setting unit 67 can set the scanning direction of the array probe 55 as multiple directions. For example, the multiple-ultrasonic beam setting unit 67 includes a first oblique scan unit 71 for tilting the scanning direction toward the tube center side (see FIG. 6) from a direction perpendicular to the center axis 31 of the tube material 30, a vertical scan unit 72 for setting the scanning direction perpendicularly to the center axis 31 (see FIG. 1), and a second oblique scan unit 73 for tilting the scanning direction toward the tube end side (see FIG. 7) from the direction perpendicular to the center axis 31, thereby setting three scanning directions. The settings by the first oblique scan unit 71 and the second oblique scan unit 73 will be described later. The setting by the vertical scan unit 72 will be described below. As illustrated in FIG. 1, the oscillation times 54 of the array elements 56 are all set as the same time, so that the scanning direction of the array probe 55 is perpendicular to the center axis 31 of the tube material 30.

Based on the reflection echo received by the receiving unit 65 and the rotation angle of the rotating flaw-detection unit 50, the rotation angle being detected by the rotation-angle detection unit 63, the image creating unit 66 creates a flaw detection image indicating an ultrasonic reflection state of a subject (in this case, the tubesheet material 20 and the tube material 30 near the welded part 12) at the rotation angle.

The ultrasonic testing method according to the present embodiment is conducted by using the ultrasonic testing device 40 configured thus. When the ultrasonic testing method is conducted, the rotating flaw-detection unit 50 is first inserted into the tube material 30. This emits ultrasonic waves from the inner surface of the tube material 30 to the welded part 12 and the tubesheet material 20 and the tube material 30 that are located near the welded part 12. Subsequently, when the operator provides the ultrasonic testing device 40 (by pressing a start button, which is not illustrated) with a command issued by an external signal, instructions are provided for the drive unit 62 and the multiple-ultrasonic beam setting unit 67 from the instruction unit 61. The rotating flaw-detection unit 50 then is rotated about the center axis 31 of the tube material 30 by the motor 52 in a predetermined rotation direction (clockwise when viewed from the tube end side). Furthermore, ultrasonic waves are emitted from the array probe 55 to the welded part 12, the tubesheet material 20, and the tube material 30. Ultrasonic waves emitted from the array probe 55 can be emitted in various directions according to the setting of the multiple-ultrasonic beam setting unit 67. FIG. 1 illustrates, as an example, a state of emission of ultrasonic waves in a direction perpendicular to the center axis 31 of the tube material 30.

The echo (reflection echo) of the emitted ultrasonic waves is received by the receiving unit 65 through the array probe 55. Based on the reflection echo received by the receiving unit 65 and the rotation angle of the rotating flaw-detection unit 50, the rotation angle being detected by the rotation-angle detection unit 63, the image creating unit 66 creates a flaw detection image indicating an ultrasonic reflection state of the welded part 12, the tubesheet material 20, and the tube material 30.

Figure 3:
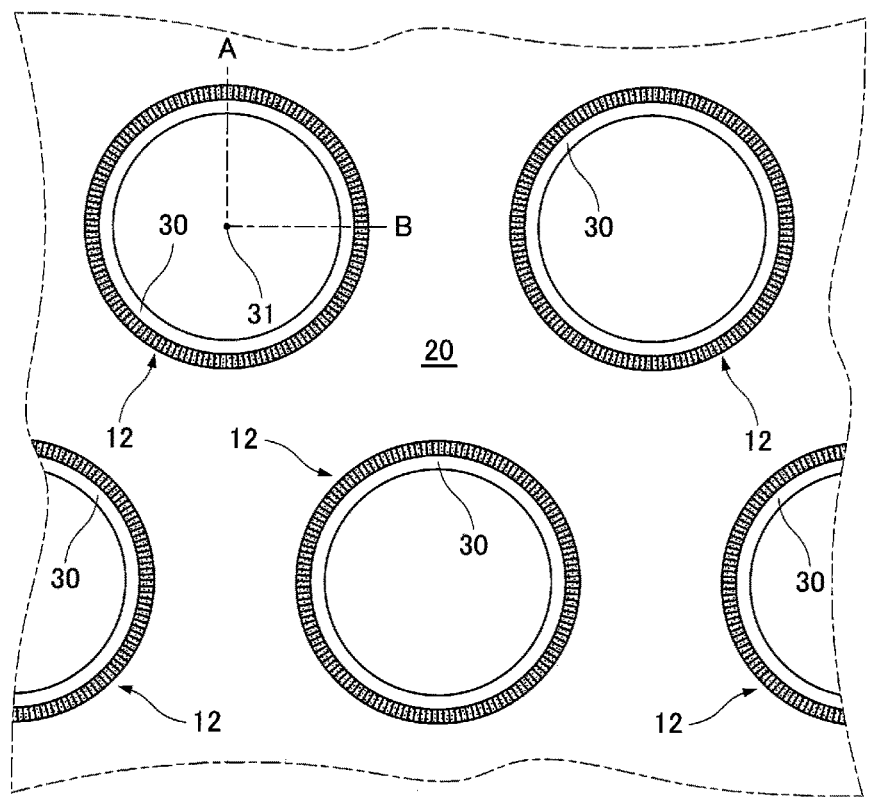
FIG. 3 is a plan view illustrating a tube material to tubesheet material welds that are examined by the ultrasonic testing device in FIG. 1.
Figure 4:
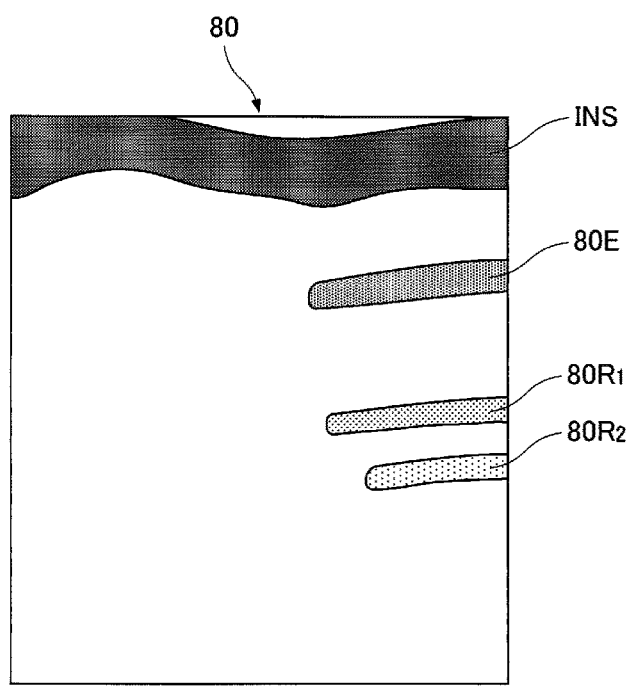
FIG. 4 illustrates a straight beam linear scan image obtained at a rotation angle A of FIG. 3.

FIG. 4 illustrates an example of a flaw detection image created by the image creating unit 66. FIG. 4 illustrates a result obtained by flaw testing in which the rotating flaw-detection unit 50 inserted into the upper left tube material 30 in FIG. 3 emits ultrasonic waves in a scanning direction set by the vertical scan unit 72 at a rotation angle A (0°), that is, a straight beamlinear scan image 80. It is assumed that the welded part 12, the tubesheet material 20, and the tube material 30 are not flawed at the rotation angle A. The rendering method of this image is merely exemplary. The image is a contour figure with the vertical axis indicating a direction from the inner surface of the tube material 30 to the outside, the horizontal axis indicating a direction from the tube end side to the tube center side, and coloring indicating the intensity of a reflection echo. The intensity of a reflection echo is represented as shades of gray in FIG. 4, but in reality, the intensity can be represented as gradations of red or blue in reality.

[Straight Beam Linear Scan Image 80 at Rotation Angle A]

In the straight beam linear scan image 80 at the rotation angle A, a bottom echo signal 80E, a repeated echo signal 80$R_1$, and another repeated echo signal 80$R_2$ are confirmed in a region other than a region serving as a dead zone INS located very close to the array probe 55. The bottom echo signal 80E is a signal obtained by reflecting ultrasonic waves (generating a bottom echo) at a position where a small clearance located between the welded part 12 and the tubesheet material 20 and near the tube center side is formed on the outer surface (bottom) of the tube material 30, that is, a position where the continuity of the properties of the tube material 30 (acoustic continuity) is interrupted. The repeated echo signals 80$R_1$ and 80$R_2$ are signals obtained by repeatedly reflecting the bottom echo. In this way, a bottom echo is obtained at an unflawed point, so that the bottom echo signal 80E and the repeated echo signals 80$R_1$ and 80$R_2$ are confirmed in a flaw detection image (in this case, the straight beam linear scan image 80).

[Straight beam linear scan image 90 at rotation angle B]

Figure 5:
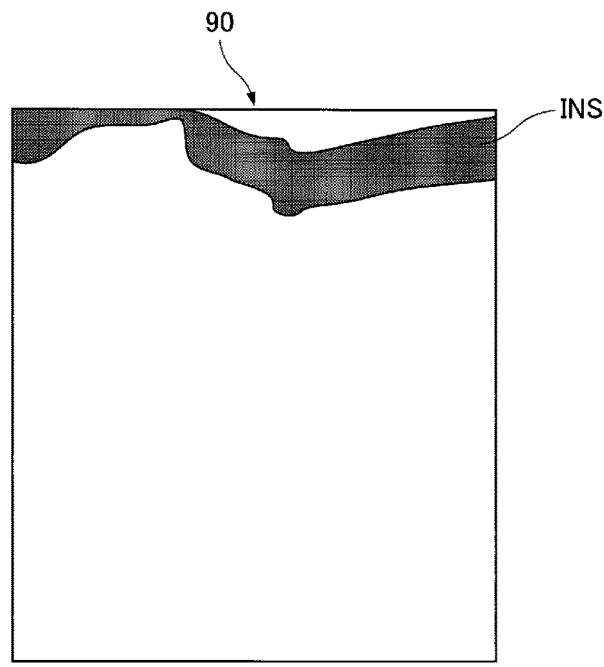
FIG. 5 illustrates a straight beam linear scan image obtained at a rotation angle B of FIG. 3.

FIG. 5 illustrates a straight beam linear scan image 90 at a rotation angle B of FIG. 3. At the rotation angle B, as illustrated in FIG. 1, it is assumed that the tube material 30 has the flaw 5 that scatters ultrasonic waves. In the straight beam linear scan image 90 at the rotation angle B, the bottom echo signal 80E and the repeated echo signals $80R_1$ and $80R_2$, which are confirmed at the rotation angle A, are not confirmed. This is because the flaw 5 that scatters ultrasonic waves emitted to the outer surface of the tube material 30 interferes with the acquisition of a bottom echo from the outer surface (bottom) of the tube material 30.

[Flaw Presence Determination]

As has been discussed, a bottom echo is not obtained (or a bottom echo is much weaker than those at other points) at a point having the flaw 5 that scatters ultrasonic waves. Thus, by comparing a flaw detection image where the bottom echo signal 80E is confirmed (the straight beam linear scan image 80 at the rotation angle A) and a flaw detection image where the bottom echo signal 80E is not confirmed (the straight beam linear scan image 90 at the rotation angle B), it can be determined that the flaw 5 is present at a point where a bottom echo is not obtained (or a weak bottom echo is obtained). In the comparison between the rotation angle A and the rotation angle B, it is determined that the flaw 5 is present from the center axis 31 of the tube material in the direction of the rotation angle B. The determination may be made by comparing the flaw detection images at the rotation angles by the operator or may be automatically made by an image analysis program. In the automatic determination, the ultrasonic testing device 40 may have the function of automatically determining the point of the flaw 5 by identifying a point where a bottom echo cannot be obtained, the point being identified by analyzing result data on flaw testing without creating an image. Moreover, a criterion for determining whether a bottom echo is weak or not is optionally set according to flaw testing conditions or a subject. For example, the intensity of a bottom echo signal obtained at an unflawed point (the rotation angle A in the foregoing example) is assumed to be reference intensity, and a threshold value is set at 30% of the reference intensity. If signals obtained at other points (e.g., the rotation angle B) are compared with the threshold value and are found to be lower than the threshold value, the signals may be regarded as weak signals. In this case, data on the unflawed point may be flaw testing result data that is obtained by pretesting a standard structure on which the absence of flaws is confirmed in advance (the structure has the same properties as the subject except for the presence or absence of a flaw). Also in the case where the operator makes a visual determination in a flaw detection image, a criterion may be preset to determine how a signal regarded as a weak signal is displayed (colors or gradations) in the image.

[Oblique Scan]

In the present embodiment, an oblique scan is performed in addition to the straight beam linear scan (FIG. 1). As has been discussed, the multiple-ultrasonic beam setting unit 67 (FIG. 2) includes the first oblique scan unit 71 and the second oblique scan unit 73 in addition to the vertical scan unit 72. These units adjust the oscillation times 54 of the array elements 56, thereby setting the scanning direction of the array probe 55 to a direction tilted from a direction perpendicular to the center axis 31 of the tube material 30.

Figure 6:
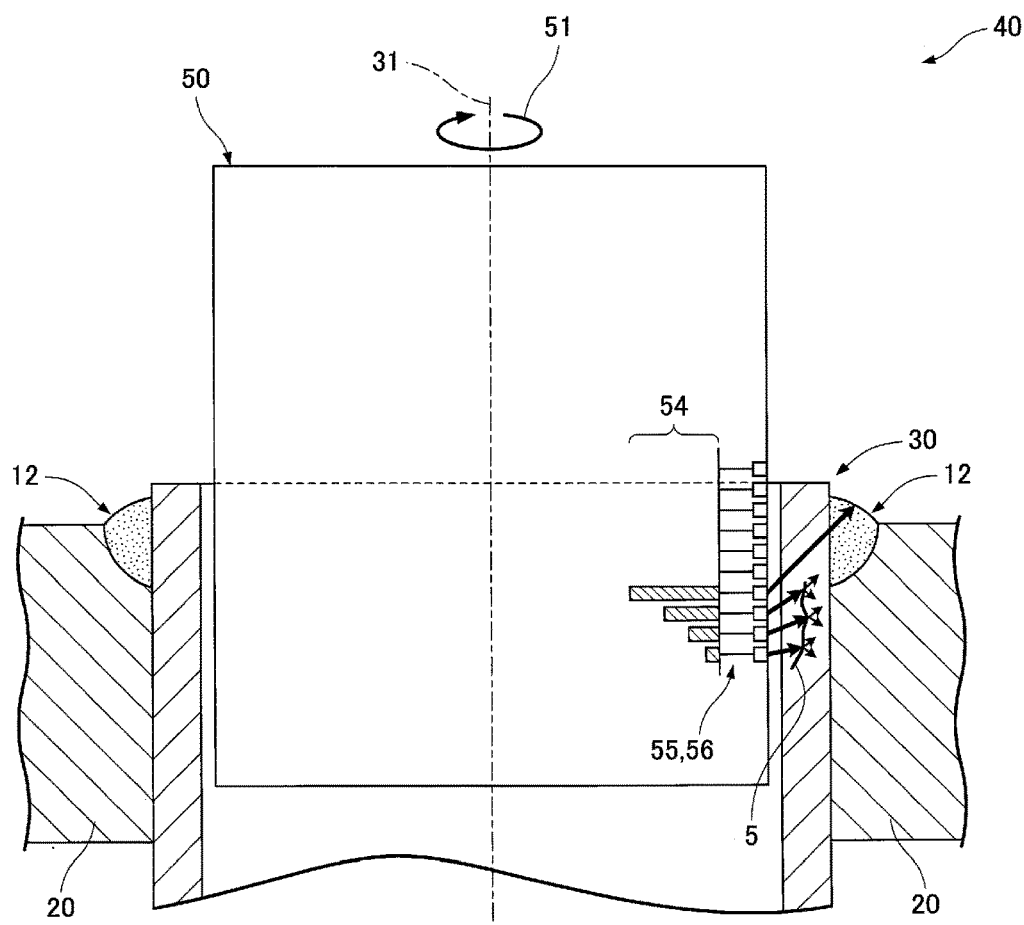
FIG. 6 is a longitudinal section of the ultrasonic testing device that emits ultrasonic waves from the tube center side to the tube end side.

FIG. 6 illustrates the setting of the scanning direction of the array probe 55 by the first oblique scan unit 71. As illustrated in FIG. 6, the oscillation times 54 of the array elements 56 are set to be delayed from the tube center side toward the tube end side, so that the scanning direction of the array probe 55 is tilted toward the tube end side from the direction perpendicular to the center axis 31 of the tube material 30. Flaw detection (sector scan) in a wide and sectoral range as illustrated in FIG. 6 is performed by forming a synthetic wave front, on which ultrasonic waves emitted from the array elements 56 are superimposed, actually with proper control on the oscillation times 54, and adjusting the propagation direction and focal range of ultrasonic waves to desired parameters. However, for the simplification of FIG. 6, an arrow is schematically extended from each of the array elements 56.

Figure 7:
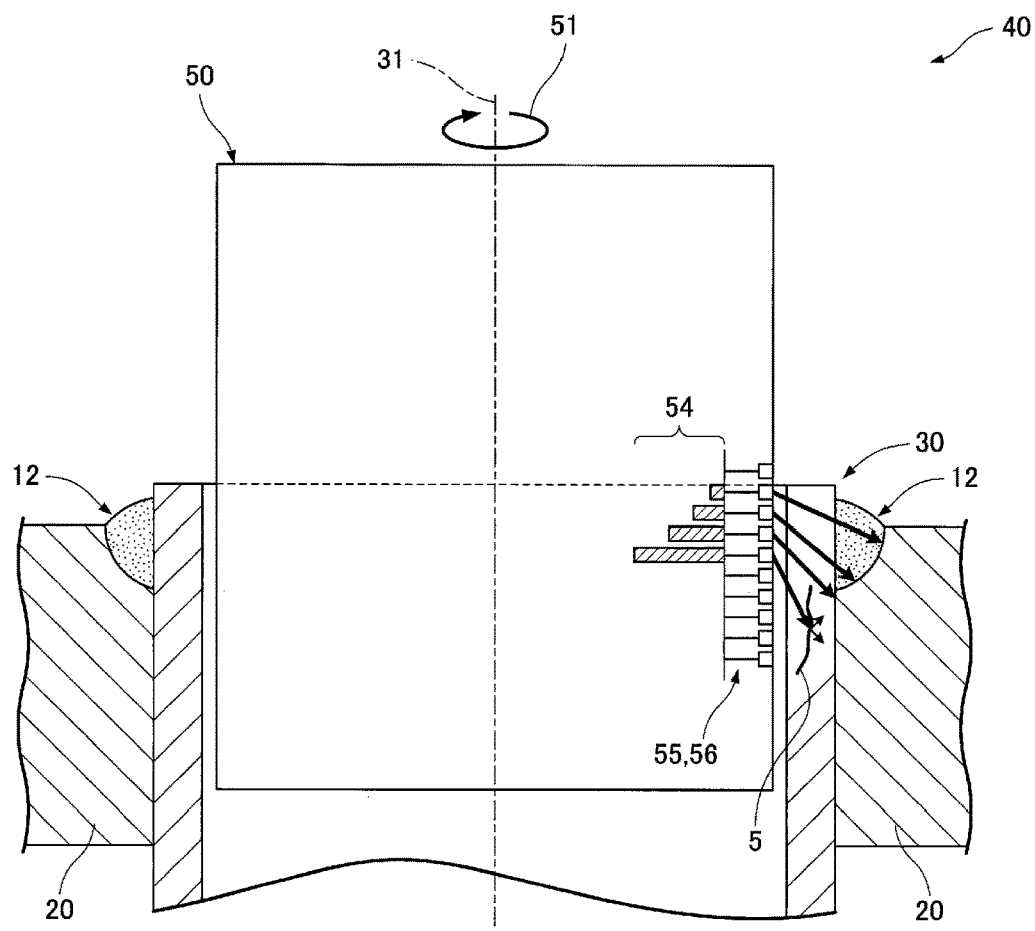
FIG. 7 is a longitudinal section of the ultrasonic device that emits ultrasonic waves from the tube end side to the tube center side.

FIG. 7 illustrates the setting of the scanning direction of the array probe 55 by the second oblique scan unit 73. FIG. 7 is a schematic diagram like FIG. 6.

As illustrated in FIG. 7, the oscillation times 54 of the array elements 56 are set to be delayed from the tube end side toward the tube center side, so that the scanning direction of the array probe 55 is tilted toward the tube center side from the direction perpendicular to the center axis 31 of the tube material 30.

Ultrasonic waves in the multiple directions (in this case, three directions) are simultaneously emitted in the respective directions from the array probe 55 or emitted with a delay (e.g., about 0.01 to 0.1 seconds) that is not perceivable to humans.

Figure 8:
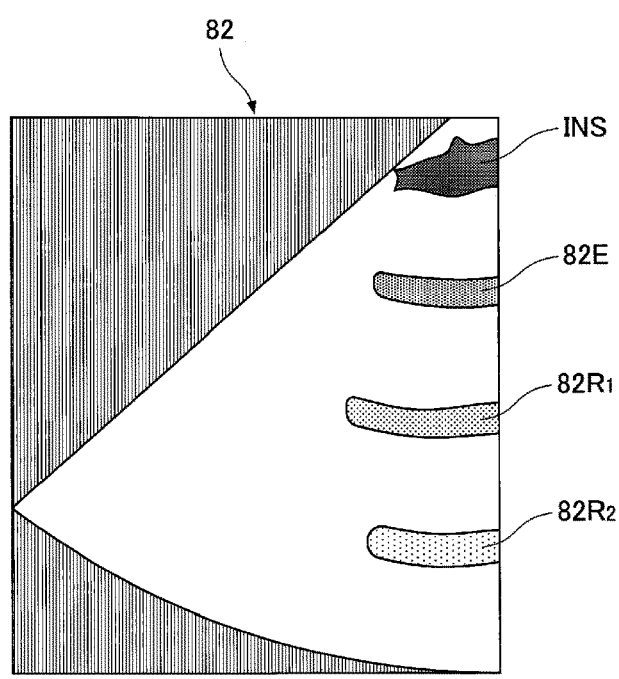
FIG. 8 illustrates an oblique scan image obtained at the rotation angle A by emitting ultrasonic waves to the tube end side.

The image creating unit 66 creates a flaw detection image also for the result of oblique scan. FIG. 8 illustrates an example of the created flaw detection image. FIG. 8 illustrates a result obtained by flaw testing in which the rotating flaw-detection unit 50 inserted in the upper left tube material 30 in FIG. 3 emits ultrasonic waves in a scanning direction set by the first oblique scan unit 71 at the rotation angle A (0°), that is, a first oblique scan image 82. In the first oblique scan image 82 at the rotation angle A, a bottom echo signal 82E, a repeated echo signal $82R_1$, and another repeated echo signal $82R_2$ are confirmed in a region other than the dead zone INS. In this way, even if an oblique scan is performed, a bottom echo is obtained at an unflawed point (rotation angle A), so that the bottom echo signal 82E and the repeated echo signals $82R_1$ and $82R_2$ are confirmed in a flaw detection image (in this case, the first oblique scan image 82).

Figure 9:
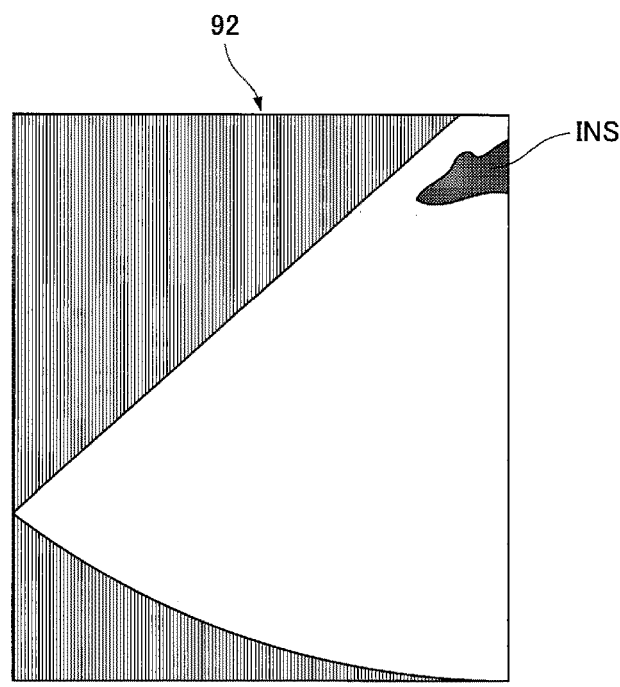
FIG. 9 illustrates an oblique scan image obtained at the rotation angle B by emitting ultrasonic waves to the tube end side.

FIG. 9 illustrates a first oblique scan image 92 at the rotation angle B of FIG. 3. In the first oblique scan image 92 at the rotation angle B, the bottom echo signal 82E and the repeated echo signals $82R_1$ and $82R_2$, which are confirmed in the first oblique scan image 82 at the rotation angle A, are not confirmed.

As has been discussed, even if an oblique scan is performed, a bottom echo is not obtained (or a bottom echo is much weaker than those at other points) at a point having the flaw 5 that scatters ultrasonic waves. Thus, by comparing a flaw detection image where the bottom echo signal 82E is confirmed (the first oblique scan image 82 at the rotation angle A) and a flaw detection image where the bottom echo signal 82E is not confirmed (the first oblique scan image 92 at the rotation angle B), it can be determined that the flaw 5 is present at a point where a bottom echo is not obtained (or a weak bottom echo is obtained).

[Integrated Image]

As has been discussed, the flaw detection images created at the respective rotation angles as the results of flaw testing in the respective scanning directions are compared and verified between the rotation angles, thereby determining the presence or absence of the flaw 5. Moreover, the image processing unit 68 integrates flaw detection images in multiple scanning directions by image processing, thereby collectively verifying the results of flaw testing in the multiple directions. As has been discussed, the array probe 55 can perform flaw testing in multiple scanning directions (in this case, three directions) set by the multiple-ultrasonic beam setting unit 67. The image creating unit 66 creates a flaw detection image in each of the scanning directions, thereby creating multiple, that is, three flaw detection images. The image processing unit 68 combines the three images into an integrated image. The single integrated image includes all pieces of information about reflection echo intensity in flaw testing performed in the three directions. Thus, by verification of the integrated image, the results of the flaw testing in the three directions can be collectively verified.

Figure 10:
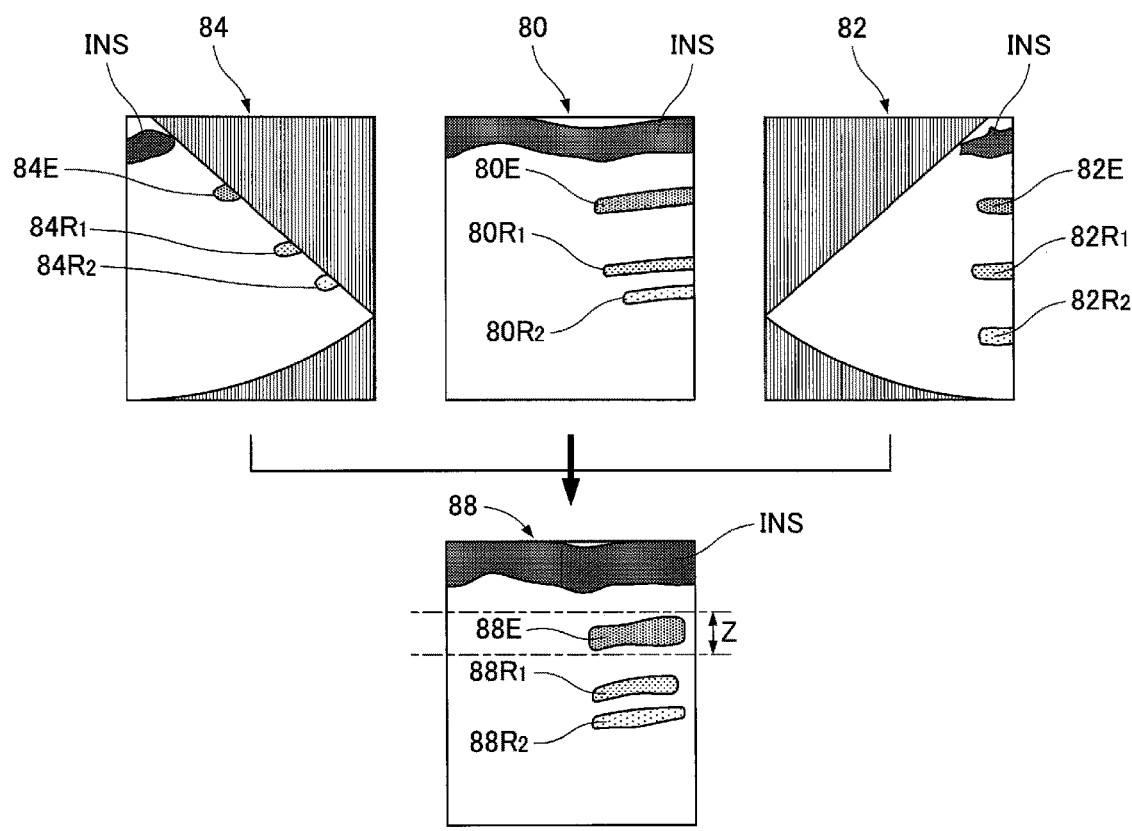
FIG. 10 illustrates the outline of the creation of an integrated image at the rotation angle A.

FIG. 10 illustrates the outline of the creation of an integrated image 88 by the image processing unit 68. FIG. 10 illustrates the results of flaw testing conducted at the rotation angle A (0°) by the rotating flaw-detection unit 50 inserted in the upper left tube material 30 in FIG. 3. As the results of flaw testing in scanning directions that are set by the vertical scan unit 72, the first oblique scan unit 71, and the second oblique scan unit 73, FIG. 10 illustrates the straight beam linear scan image 80, the first oblique scan image 82, and a second oblique scan image 84 that are created by the image creating unit 66. The image processing unit 68 combines the three images in the respective scanning directions into the integrated image 88. The integrated image 88 at the rotation angle A includes all pieces of information about the straight beam linear scan image 80, the first oblique scan image 82, and the second oblique scan image 84. Specifically, information about the bottom echo signal 80E and the repeated echo signals 80I and $80R_2$ in the straight beam linear scan image 80, information about the bottom echo signal 82E and the repeated echo signals 82I and $82R_2$ in the first oblique scan image 82, and information about a bottom echo signal 84E and the repeated echo signals $84R_1$ and $84R_2$ in the second oblique scan image 84 are integrated, so that the presence of a bottom echo signal 88E and repeated echo signals $88R_1$ and $88R_2$ can be confirmed from the integrated image 88.

Figure 11:
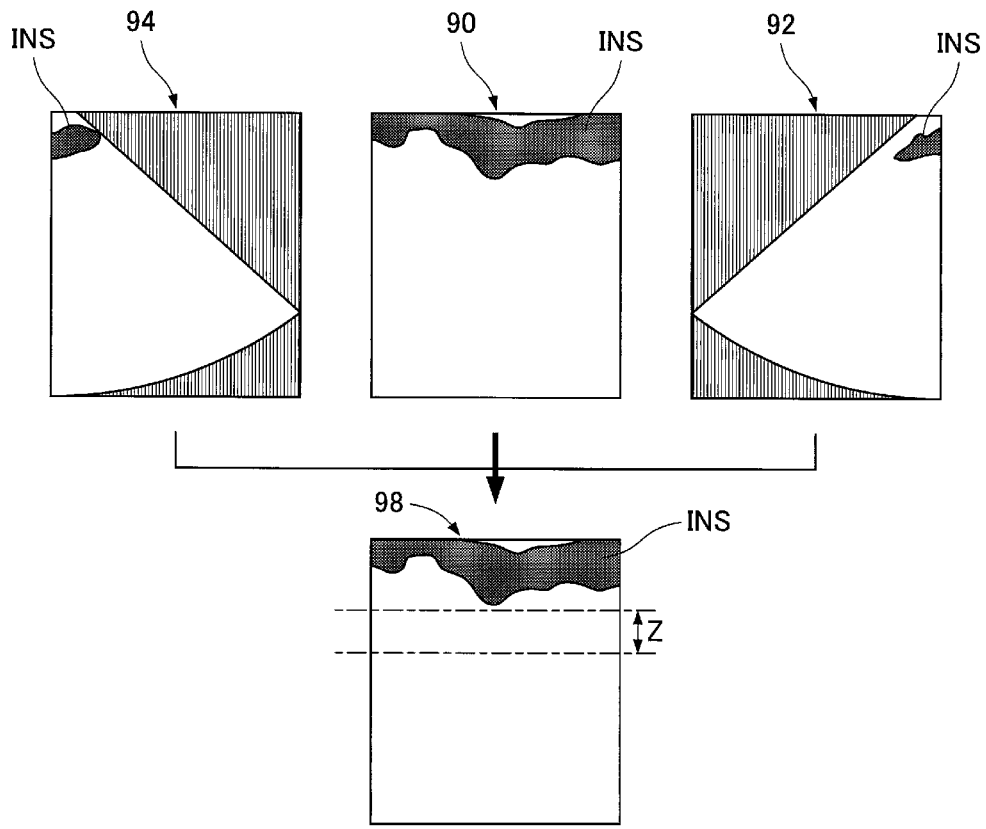
FIG. 11 illustrates the outline of the creation of an integrated image at the rotation angle B.

The image processing unit 68 can create such an integrated image at each rotation angle. FIG. 11 illustrates the results of flaw testing conducted at the rotation angle B by the rotating flaw-detection unit 50 inserted in the upper left tube material 30 in FIG. 3. The image processing unit 68 creates an integrated image 98 at the rotation angle B by combining the straight beam linear scan image 90, the first oblique scan image 92, and a second oblique scan image 94 at the rotation angle B. By comparing the integrated image 98 with the integrated image 88 at the rotation angle A, the presence of the flaw 5 can be determined at the rotation angle B where the reflection echo signal 88E is not confirmed.

In this way, the integrated images 88 and 98 of the flaw detection images in the respective scanning directions are created at the respective rotation angles of the array probe 55, and the integrated images 88 and at the respective rotation angles are compared with each other between the rotation angles. This can determine, as the point of the flaw 5, the rotation angle B where a bottom echo is not present (or a rotation angle having a much weaker bottom echo than other rotation angles).

[Whole-Angle Image]

The image processing unit 68 can create a whole-angle image, which will be described later, by performing image processing based on flaw detection images at multiple rotation angles. Through the whole-angle image, the point (rotation angle) of the flaw 5 can be determined by verifying the overall scanning range (in this case, 360° around the tube material 30) without comparing the flaw detection images at the rotation angles.

Figure 12:
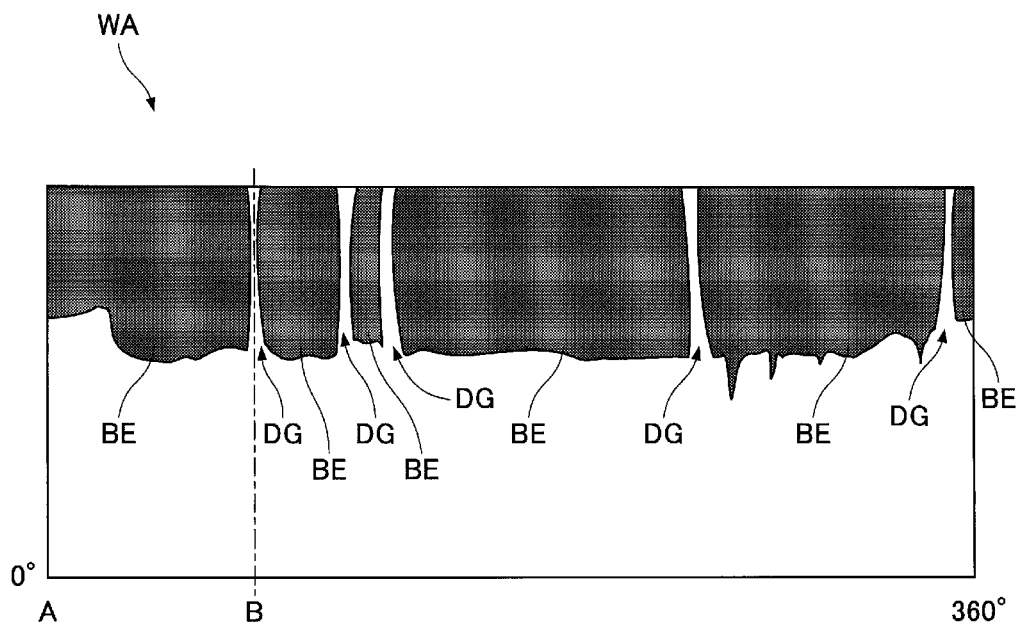
FIG. 12 illustrates an example of a whole-angle image.

FIG. 12 illustrates an example of a whole-angle image WA. Through the whole-angle image WA, the presence or absence of a bottom echo can be verified at each rotation angle while the rotating flaw-detection unit 50 inserted in the upper left tube material 30 in FIG. 3 rotates from 0° to 360°. The whole-angle image WA is created based on a flaw detection image at each rotation angle. When the whole-angle image WA is created, the image processing unit 68 first sets a bottom echo region Z as a part expected to have a bottom echo in each flaw detection image. As illustrated in, for example, the integrated image 88 of FIG. 10, in the flaw detection image where the bottom echo signal 88E is confirmed, the bottom echo region Z is set as a region including a part that displays the bottom echo signal 88E. Specifically, the bottom echo region Z is set based on how far a position from which the bottom echo signal 88E is to come is away from the array probe 55. In this case, a certain range in a direction (vertical axis of the image) from the inner surface of the tube material 30 to the outside is set as the bottom echo region Z. The setting of the bottom echo region Z can be calculated based on the thickness of the tube material 30 if the thickness is a known thickness uniformly set around the tube material 30. For example, if the tube material 30 has a thickness of about 2 mm, the bottom echo region Z is set in the range of 2.1 mm to 4.9 mm. The bottom echo region Z may be calculated based on a measurement result obtained for the thickness of the tube material 30 with a single array probe or the like. Alternatively, the flaw detection images may be confirmed by the operator or an image processing program to set the bottom echo region Z based on a part where a bottom echo is actually found.

The bottom echo region Z set thus is applied to the flaw detection images at the rotation angle, and then the image of the bottom echo region Z is extracted. For example, an image that displays the bottom echo signal 88E is obtained from the integrated image 88 (rotation angle A) of FIG. 10, whereas an image that does not display a bottom echo signal is obtained from the integrated image 98 (rotation angle B) of FIG. 11. After the images of the bottom echo region Z are extracted from the flaw detection images at the rotation images, the images are arranged in the order of rotation angles. In FIG. 12, the extracted images of the bottom echo region Z from the integrated image 88 (rotation angle A) of FIG. 10 and the integrated image 98 (rotation angle B) of FIG. 11 are rotated 90° to the left and are arranged with the horizontal axis indicating the rotation angles, so that the whole-angle image WA is obtained. In this case, the vertical axis corresponds to a direction from the tube center side to the tube end side.

The whole-angle image WA shows that the bottom echo signal BE is confirmed at most rotation angles including the rotation angle A, whereas a groove signal DG is confirmed at some rotation angles, such as the rotation angle B, while the bottom echo signal BE is weak or absent at these rotation angles. Thus, the rotation angles having the groove signal DG can be determined as rotation angles where a bottom echo is not present (or a bottom echo is weak), that is, the points of the flaws 5.

In the foregoing description, the bottom echo region Z is set for the integrated images 88 and 98, and the whole-angle image WA is created based on the integrated images at the rotation angles. However, the whole-angle image can be created based on a straight beam linear scan image or an oblique scan image by properly setting the bottom echo region Z.

Example

A test was conducted to confirm that a flaw can be detected by the ultrasonic testing method according to the present invention. As illustrated in FIG. 3, a specimen having a structure of austenitic stainless steel was prepared. The structure includes the tube materials 30 welded perpendicularly to the tubesheet material 20. The specimen was exposed to environments where stress-corrosion cracking is likely to occur. For example, the specimen was heated or dipped into an etchant containing a magnesium chloride solution. Thereafter, the rotation flaw-detection unit 50 was inserted into one of the tube materials 30 of the specimen, flaw testing was performed 360° around the tube material 30 from the inner surface, and then a whole-angle image was created from the result of testing. In the whole-angle image, a groove signal was confirmed but a bottom echo was not found at a rotation angle of 35° (a position after the rotation flaw-detection unit 50 rotated 35° from the starting position of flaw detection). The tube material 30 was cut in the direction of 35° to confirm a longitudinal section. Like the flaw 5 in FIG. 1, a flaw like a crack was found at a position on the tube center side of the tube material 30. Such a crack in the tube material 30 may extend into, for example, the welded part 12. This may cause failures such as leakage of fluid to the outside through the tube material 30 in, for example, a multipipe heat exchanger in a chemical plant. Regarding this problem, it was confirmed that the ultrasonic testing method of the present invention can quickly detect cracks that may cause such failures. Moreover, it was confirmed that the ultrasonic testing method of the present invention can detect a flaw not only in a welded part but also in a base material, e.g., a tube material when a subject having the welded part is examined.

The ultrasonic testing method of the present invention was described based on the example of the embodiment. The present invention is not limited to the described embodiment and can be modified and improved in various ways. Some modifications will be described below. The modifications are merely exemplary and are not supposed to limit the present invention to these modifications.

In the example of the embodiment, the tube material 30 welded perpendicularly to the tubesheet material 20 is examined. The subject of the ultrasonic testing method of the present invention is not limited to the tube 30. The present invention is applicable to any subject to be examined using ultrasonic waves. Specifically, an examination can be conducted on a subject that can be scanned in a scanning range by moving an array probe, in which a plurality of array elements for emitting ultrasonic waves are placed along the array placement direction, in a direction different from (typically a direction orthogonal to) the array placement direction while performing flaw testing with ultrasonic waves emitted from the array elements into the scanning range specified for the subject. The array probe may move diagonally or in any curved path with respect to the array placement direction or move partially in the same direction as the array placement direction depending upon the subject. If such a scan cannot obtain a bottom echo (or a bottom echo is weak) at a point, it can be determined that a flaw is present at the point. The ultrasonic testing method of the present invention is applicable to, for example, a flat plate that is a specific subject other than the tube material 20. The example of the embodiment describes an examination using the so-called phased-array method. An examination technique to which the ultrasonic testing method of the present invention is applicable is not limited to this method. The present invention is applicable to any examination technique using an array probe. For example, the ultrasonic testing method of the present invention is also applicable to an examination using aperture synthesis (FMC/TFM).

Moreover, in the example of the embodiment, the tubesheet material 20 is welded perpendicularly to the tube material 30. The tubesheet material 20 does not always need to be perpendicular to the tube material 30. An acute angle may be formed between the tube material 30 and the tubesheet material 20. Furthermore, in the example of the embodiment, the tube materials 30 are disposed in parallel. The tube materials 30 do not always need to be disposed in parallel. The single tube material 30 may be provided instead.

In the example of the embodiment, the array probe 55 is simply rotated in the tube material 30 during flaw testing. The array probe 55 may be pressed to the inner surface of the tube material 30 during flaw testing. The ultrasonic testing device 40 may include a unit for pressing the array probe 55 to the inner surface of the tube material 30, for example, a pressing mechanism that can move the array probe 55 to the inner surface of the tube material 30 with an elastic force. With this configuration, even if the inside diameter of the tube material 30 is not determined or the inside diameter becomes uneven due to corrosion or the like, the array probe 55 can be securely brought close to the inner surface of the tube material 30. Furthermore, the propagation efficiency of ultrasonic waves from the array probe 55 to the tube material 30 improves, thereby obtaining a clear bottom echo at an unflawed point. This facilitates the detection of a flawed point where a bottom echo is weak. When the array probe 55 is pressed to the inner surface of the tube material 30, pressing from two points on the tube end side and the tube center side ensures higher stability, thereby properly pressing the array probe 55 to the inner surface of the tube material 30. This prevents the array probe 55 from separating from the inner surface of the tube material 30 and causing erroneous detection, for example, the disappearance of a bottom echo at a point where the flaw 5 is not present.

In the example of the embodiment, the scanning directions are three directions: a direction perpendicular to the center axis 31 of the tube material 30, a direction tilted to one side (tube end side) from the direction perpendicular to the center axis 31, and a direction tilted to the other side (tube center side) from the direction perpendicular to the center axis 31. However, the scanning directions are not limited thereto. The scanning directions may include scanning directions tilted in the same direction with different tilt angles, include four or more directions, or include only one or two directions. Scanning in various directions enable flaw detection over a wide range. As has been discussed, a flawed point can be found only from, for example, a straight beam linear scan image.

In the example of the embodiment, an oblique scan is used as a sector scan (oblique sector scan) in FIGS. 6 and 7. A linear scan can be used instead. Specifically, a flaw may be detected by an oblique liner scan in a scanning direction tilted to one side from the direction perpendicular to the center axis 31 of the tube material 30 and a scanning direction tilted to the other side from the direction perpendicular to the center axis 31 of the tube material 30. In this way, if a vertical scan and an oblique scan are both performed as linear scans, the accuracy of flaw testing improves because the flaw testing conditions in the directions agree with each other. Flaw detection by a sector scan in a sectoral flaw detection range can be more widely performed.

REFERENCE SIGNS LIST

5 Flaw
12 Welded part
20 Tubesheet material
30 Tube material
31 Center axis
40 Ultrasonic testing device
50 Rotation search unit
51 Rotation direction
52 Motor
53 Encoder
54 Oscillation time
55 Array probe
56 Array element
60 Control unit
61 Instruction unit
62 Drive unit
63 Rotation-angle detection unit
64 Transmitting unit
65 Receiving unit
66 Image creating unit
67 Multiple-ultrasonic beam setting unit
68 Image processing unit
71 First oblique scan unit
72 Vertical scan unit
73 Second oblique scan unit
80 Straight beam linear scan image (rotation angle A)
80E Bottom echo signal
80R$_1$ Repeated echo signal
80R$_2$ Repeated echo signal
82 First oblique scan image (rotation angle A)
82E Bottom echo signal
82R$_1$ Repeated echo signal
82R$_2$ Repeated echo signal
84 Second oblique scan image (rotation angle A)
88 Integrated image (rotation angle A)
88 Bottom echo signal
88R$_1$ Repeated echo signal
88R$_2$ Repeated echo signal
90 Straight beam linear scan image (rotation angle B)
92 First oblique scan image (rotation angle B)
94 Second oblique scan image (rotation angle B)
98 Integrated image (rotation angle B)
A Rotation angle
B Rotation angle
BE Bottom echo signal
DG Groove signal
INS Dead zone
WA Whole-angle image
Z Bottom echo region

The invention claimed is:

1. An ultrasonic testing method for detecting a flaw of a subject being a tube material by using ultrasonic waves, the method comprising:
   scanning in a scanning range specified for the subject by moving an array probe including a plurality of ultrasonic wave emission elements, the array probe being moved in a direction different from an array placement direction of the ultrasonic wave emission elements while performing flaw testing with ultrasonic waves emitted from the ultrasonic wave emission elements into the scanning range, in the scanning, the array probe being rotated about a center axis of the tube material along an inner surface of the tube material, the array probe being inserted in the tube material such that the ultrasonic wave emission elements placement direction is parallel to a lengthwise direction of the tube material;
   creating flaw detection images at rotation angles of the array probe rotated about the center axis of the tube material, each flaw detection image being created as a result of flaw testing in the scanning based on an echo of ultrasonic waves emitted by the array probe; and
   determining that a flaw is present at a point where a bottom echo is not obtained by scanning or at a point having a weaker bottom echo than other points in the scanning range, wherein in the determining, the flaw detection images being compared between the rotation angles,
   wherein in the creating of each of the flaw detection images, a bottom echo region is extracted as a part expected to have a bottom echo in each of the flaw detection images, wherein a whole-angle image is created such that images of the bottom echo region at the rotation angles are arranged in an order of the rotation angles, and
   wherein in the determining, it is determined that a flaw is present at rotation angles having a groove signal where a bottom echo is not obtained or a bottom echo is weaker than other rotation angles in the whole-angle image.

2. The ultrasonic testing method according to claim 1, wherein in the scanning, the array probe is set so as to be turned to multiple scanning directions, the multiple scanning directions include at least two directions of the following three directions: a direction tilted to a tube end side from a direction perpendicular to the center axis of the tube material, the direction perpendicular to the center axis of the tube material, and a direction tilted to a tube center side from the direction perpendicular to the center axis of the tube material, and
   wherein in the creating of the flaw detection images, a respective flaw detection image resulting from flaw testing in the scanning based on an echo of ultrasonic waves emitted by the array probe is created in each of the multiple scanning directions, and
   wherein the respective flaw detection images corresponding to the multiple scanning directions are combined into an integrated image.

3. The ultrasonic testing method according to claim 1, wherein in the scanning, flaw testing is performed with the array probe pressed to the inner surface of the tube material.

4. An ultrasonic testing device for detecting a flaw of a subject being a tube material by using ultrasonic waves, the device comprising:
   an array probe including a plurality of ultrasonic wave emission, the ultrasonic wave emission elements being arranged in an ultrasonic wave emission elements placement direction; and
   a motor for moving the array probe in a direction different from the ultrasonic wave emission elements placement direction;
   wherein the array probe is configured to move and perform flaw testing with ultrasonic waves emitted from the ultrasonic wave emission elements into a scanning range specified for the subject, the flaw testing being performed while the array probe is rotated by means of the motor, and the array probe is rotated about a center axis of the tube material along an inner surface of the tube material, the array probe being inserted in the tube material such that the ultrasonic wave emission elements placement direction is parallel to a lengthwise direction of the tube material, wherein the ultrasonic testing device is configured to create flaw detection images at rotation angles of the array probe rotated about the center axis of the tube material, each of the flaw detection image being created as a result of flaw testing in the scanning based on an echo of ultrasonic waves emitted by the array probe, wherein the ultrasonic testing device is configured to extract a bottom echo region as a part expected to have a bottom echo in each of the flaw detection images, wherein the ultrasonic testing device is configured to create a whole-angle image such that images of the bottom echo region at the rotation angles are arranged in an order of the rotation angles, and wherein the ultrasonic testing device determines that a flaw is present at rotation angles having a groove signal where a bottom echo is not obtained or a bottom echo is weaker than other rotation angles in the whole-angle image.

* * * * *